(12) United States Patent
Rice

(10) Patent No.: US 6,363,087 B1
(45) Date of Patent: Mar. 26, 2002

(54) MULTIMODE RAMAN FIBER AMPLIFIER AND METHOD

(75) Inventor: Robert R. Rice, Chesterfield, MO (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 09/488,115

(22) Filed: Jan. 20, 2000

(51) Int. Cl.[7] .............................. H01S 3/30; G02B 6/02; G02B 6/22
(52) U.S. Cl. .............................. 372/3; 372/6; 385/126; 385/127
(58) Field of Search .................. 372/3, 6; 385/122–128

(56) References Cited

U.S. PATENT DOCUMENTS

| | | |
|---|---|---|
| 4,717,842 A | 1/1988 | Komine |
| 4,778,238 A | 10/1988 | Hicks |
| 4,807,953 A | 2/1989 | Smith et al. |
| 4,815,079 A * | 3/1989 | Snitzer et al. .................. 372/6 |
| 4,922,481 A | 5/1990 | Hicks |
| 5,208,881 A | 5/1993 | Bruesselbach |
| 5,291,501 A * | 3/1994 | Hanna ............................. 372/6 |
| 5,434,942 A | 7/1995 | Jackel et al. |
| 5,841,797 A | 11/1998 | Ventrudo et al. |
| 5,892,615 A | 4/1999 | Grubb et al. |
| 5,898,802 A | 4/1999 | Chen et al. |

* cited by examiner

Primary Examiner—Frank G. Font
Assistant Examiner—Armando Rodriguez
(74) Attorney, Agent, or Firm—Harness Dickey & Pierce P.L.C.

(57) ABSTRACT

A multimode Raman fiber amplifier and method for generating high levels of laser output power from arbitrary pump laser wavelengths using Stimulated Raman Scattering (SRS) in optical fibers of a dual clad design. The optical fibers are amplified in such a manner that facilitates high power, improves brightness conversion, increases conversion efficiency, effectuates lower laser pump brightness, and increases output beam quality. The invention includes a signal core which can support an arbitrary multimode signal from a pump laser, an SRS pump core, and low index outer cladding. The refractive indices of the aforementioned are designed to propagate SRS along the length of the optical fiber.

15 Claims, 1 Drawing Sheet

MULTIMODE RAMAN FIBER AMPLIFIER AND METHOD

TECHNICAL FIELD

This invention relates to laser amplifiers, and more particularly to a laser amplifier comprising an optical fiber of dual clad design which is subjected to a Stimulated Raman Scattering (SRS) signal process by a pump laser at an arbitrary wavelength.

BACKGROUND OF THE INVENTION

The principle of SRS is widely known and used in connection with laser amplifiers. In U.S. Pat. No. 5,832,006, to Rice et al., issued Nov. 03, 1998, entitled "Phased Array Raman Laser Amplifier and Operating Method Therefor", the primary pump wavelength signal for the Raman process was propagated along with the final and any intermediate Raman shifted signals as a single mode in the inner core of the fiber. In that invention, rare earth doping was provided in the single mode core to provide gain for the primary pumping wavelength, which obviously needed to be within the gain bandwidth of the laser transition for the doping. Pumping for the rare earth dopant was provided by incoherent, multimode laser diodes for which the output was coupled into a second, outer core region characterized by a large cross sectional area and high numerical aperture. This fundamental dual clad fiber amplifier pumping concept was disclosed in U.S. Pat. No. 4,815,079 to Snitzer entitled "Optical Fiber Lasers and Amplifiers", and has recently lead to very significant advances in the power achieved from fiber amplifiers and lasers (i.e, greater than 65 W, CW, single mode).

Using a dual clad approach for Raman fiber amplifiers heretofore, to the knowledge of the applicant, has not been undertaken. Discussion of the Raman effect in fibers has been confined to single mode fiber configurations, in which the primary pumping signal for the Raman process propagates as a single mode of the fiber, as in Rice discussed above. However, SRS is a process that occurs at a point, and any point within an illuminated volume will exhibit Raman gain. In strongly waveguided structures, the gain for a mode is obtained by integrating the gain at a point over the cross-sectional area of the mode, regardless of the nature and origin of the gain.

With present day laser systems it is difficult to generate high levels of laser output power at an arbitrary wavelength, especially if good beam quality is important. There are many applications that require high average laser power at very precise wavelengths, but these wavelengths are wavelengths that do not correspond to efficient laser transitions. Two such important applications include the use of a laser to excite the sodium layer in the upper atmosphere to produce a guidestar for adaptive optical compensation of atmospherics, and the use of precisely tuned laser sources to photodisassociate chemical compounds of specific isotopes and thereby allow separation of isotopic species [e.g., $U^{235}$ from $U^{238}$]. It is also extremely difficult to generate high power in a diffraction limited beam from all laser sources, especially all-electric solid state devices. In U.S. Pat. No. 5,832,006, to Rice et al., a single mode pump signal in the Raman fiber amplifier was required to achieve efficient conversion.

In one approach, in the near infrared, pulsed and CW lasers are used to pump Optical Parametric Oscillators (OPO) to provide tunable output, but at lower power levels than are desired. Unfortunately, high beam quality is required for pumping OPOs. These devices have desirable characteristics as master oscillators, but do not permit ready scaling to high power.

In yet another application, the COIL (Chemical Oxygen Iodine Laser) is highly desirable as an interim directed energy source because it is efficient and can be packaged for a variety of military applications. However, the COIL has two drawbacks for battlefield applications: 1) the wavelength is fixed and lies at the edge of a water vapor absorption band (which produces thermal blooming of the beam), and 2) the wavelength is not eyesafe (to be eyesafe, the wavelength should be greater than about 1540 nm).

In still yet another application, the output of pulsed or CW diode pumped solid state lasers can be combined in a multimode Raman fiber amplifier. While this laser emits more than 1100 W with a poor beam quality, it is difficult to achieve the desired power with the acceptable beam quality.

It is therefore a principle object of the present invention to provide a method of generating high levels of laser output power from arbitrary pump laser wavelengths using Stimulated Raman Scattering in optical fibers of a dual clad design. The amplification of the optical fibers at SRS wavelength facilitates high power, improves brightness conversion, increase the conversion efficiency, facilitates low laser pump brightness, and increases output beam quality.

It is still another object of the present invention to provide a method which uses a laser pump that is operated in a multimode fashion.

It is yet another object of the present invention to provide a method which provides high conversion efficiency at a Raman shifted wavelength.

It is still another object of the present invention to provide an apparatus for generating high levels of laser output power at an arbitrary wavelength with high conversion efficiency, with the capacity for low multimode pump signal brightness and high output beam quality.

It is yet another object of the present invention to provide an apparatus for generating high levels of laser output power by propagating SRS gain along the length of an optical fiber using a Stimulated Raman Scattering gain principle in optical fibers of a dual clad design a signal core, which can support at least a single mode signal, a Raman and a low index outer cladding.

SUMMARY OF THE INVENTION

The present invention relates to an apparatus and method for generating high levels of laser output power using pump lasers of arbitrary wavelengths using the SRS process on optical fibers of a dual clad design. The apparatus and method of the present invention supports multimode operation of pump lasers. The apparatus and method can convert the high power multimode beam to a single mode at the Raman shifted wavelength with about 95% efficiency, thus providing a significant improvement in the efficiency of a high power laser.

In a preferred embodiment of the invention, the apparatus of the present invention generates high levels of laser output power with high conversion efficiency capacity for low multimode pump signal brightness and high output beam quality using a Stimulated Raman Scattering (SRS) gain principle in optical fibers of a dual clad design. The apparatus includes a signal core which can support a single mode signal, a Raman pump core, and a low index outer cladding. The refractive index $n_s$ of the single mode core is greater than the refractive index $n_r$ of the Raman pump core, which in turn is greater than the index $n_{cl}$ of the outer cladding. In the preferred embodiment, the signal core can be deployed within the dual cladding which increases its capacity to accommodate multimode pump laser signals.

BRIEF DESCRIPTION OF THE DRAWINGS

The various advantages of the present invention will become apparent to one skilled in the art by reading the following specification and subjoined claims and by referencing the following drawing in which:

DETAILED DESCRIPTION OF THE PREFERRED EMBODIMENTS

Figure 1:
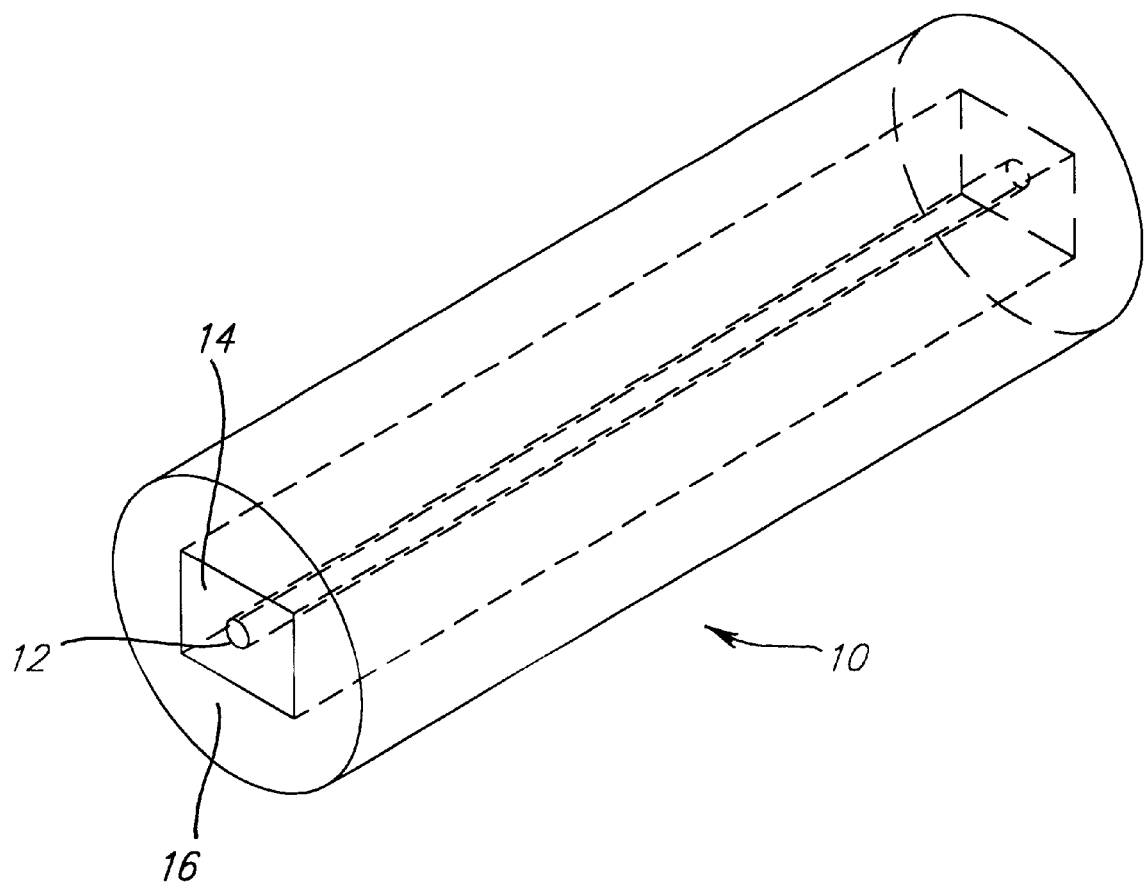
FIG. 1 is a simplified drawing of a clad Raman fiber amplifier in accordance with a preferred embodiment of the present invention.

The structure disclosed in U.S. Pat. No. 4,815,079 for coupling multimode pump power into a doped single mode core will enable the generation of Raman gain for a signal in the single mode core at the Raman shifted wavelength. Raman gain, however, is present only during pump illumination; there is no storage of energy as in a rare earth doped fiber core. A simplified drawing of a clad Raman fiber amplifier 10 is shown in FIG. 1, for which no part contains rare earth doping. The refractive indices of a signal core in the form of a single mode core 12 ($n_s$), a Raman pump core 14 ($n_r$), and a low index outer cladding 16 ($nc_{cl}$), are chosen in the order $n_s > n_r > n_{cl}$ with the dimensions chosen to satisfy several conditions to be discussed later herein.

Referring further to FIG. 1, the pump signal from a high power pulsed or CW laser, presumed to be multimode, is focused onto the rectangular region comprising the pump core 14 and the single mode core 12. It will be appreciated that the pump laser 14 could comprise a variety of different lasers. For example, semiconductor lasers and laser arrays; solid state laser devices; gas lasers, both discharge and microwave pumped; chemical lasers; and excimer lasers. The optical pumping light could also be continuous or pulsed. The focused pump beam is decomposed into modes for this structure at the pump wavelength, and after a short distance will be randomly distributed in phase and amplitude so as to produce an approximately uniform intensity distribution over the rectangular region. This produces a Raman gain at every point that is also uniformly distributed and equal to $(g_R \cdot P_p)/A_p$, where $g_R$ is the Raman gain coefficient, $P_p$ is the pump beam power, and $A_p$ is the cross-sectional area of the pump core 14. The induced gain amplifies a signal injected into the single mode core 12 at the appropriate Raman shifted wavelength. It is a property of the Raman process that the gain occurs at a photon energy reduced by a fixed amount from the energy of the pump photon, regardless of the pump photon energy. For germano-silicate single mode fiber cores commonly used in telecommunications, the gain reaches a peak value for an energy shift of about 500 cm$^{-1}$, though this value can be widely adjusted through composition.

The increase in power per unit length (i.e., $dP_s/dz$) in the single mode core is given by $(g_R \cdot P_p \cdot P_s)/A_p$. This is accompanied by a reduction of the pump power per unit length (i.e., $dP_p/dz$) that is given here by $[(\lambda_p/\lambda_s) \cdot (g_R \cdot P_p \cdot P_s)]/A_p$, where $\lambda_p$ and $\lambda_s$ are the wavelengths of the pump and signal respectively.

The power loss to the pump modes causes attenuation of the pump power distribution, but the distribution of power across the pump modes can remain approximately constant, especially if mode mixing occurs at the cladding interfaces. Hence, the single mode signal power can grow at the expense of the pump power so that essentially complete conversion takes place. If a sufficient parasitic spontaneous Raman signal develops in the pump core 14 it too can be amplified and compete with the single mode signal for the pump power. The cladding at the signal wavelength power $P_{c1}$ grows according to $dP_{c1}/dz = (g_R \cdot P_p \cdot P_{c1})/A_p$, and it must be quenched by high signal power in the single mode core or otherwise suppressed. The power in the single mode core 12 can readily generate additional Raman down shifted signals in the single mode core 12, so that process must also be controlled by design or by remedial measures.

While the use of a single mode signal core 12 as the signal core has been disclosed, it is also possible to use a signal core of larger cross sectional area that can support higher order modes of its own. In this case, efficient conversion of the pump wavelength also occurs through the Stimulated Raman Scattering (SRS) process. In fact, if a signal at the Raman shifted wavelength is launched into a multimode signal core in substantially its lowest order mode, it will be amplified. Indeed, the tendency in a long clad Raman fiber amplifier will be for the lowest order mode to grow at the expense of any higher order modes that were also inadvertently launched. One special case of interest is that for which the signal core 12 is the same size as the pump cladding 16. If the signal at the Raman shifted wavelength is launched as the relatively clean fundamental mode of the clad/signal waveguide, it will be maintained as a single mode and even further improved in beam quality as it propagates down the fiber and saturates the Raman gain. Thus, a principal advantage of the present invention is that the pump can be multimode for highly efficient coupling into the pump cladding 16, and that it can be converted to a high brightness output beam at the Raman shifted wavelength.

In SRS, a pump wave provides gain for a signal wave shifted down in frequency by an amount corresponding to the energy of an LO photon supported by the lattice of the medium (e.g., 500 cm$^{-1}$ for germano-silicate fiber cores). The growth of the Stokes (signal) wave and the depletion of the pump wave are described by the following differential equations:

$$\frac{d}{dz}I_p = -g_r I_p I_s - \alpha_p I_p \quad (1)$$

$$\frac{d}{dz}I_s = g_r I_p I_s - \alpha_s I_s$$

where $I_p$, $I_s$, and $g_r$ are the pump intensity, signal intensity, and Raman gain coefficient, respectively, and $\alpha_p$ and $\alpha_s$ are the respective attenuation coefficients. This relationship holds at a point.

In the case of a large core fiber, energy in the electric field is transported by modes of the fiber. The waveguiding is presumed to be sufficiently strong that the modes are not significantly distorted by the presence of Raman gain or loss or by scattering at the core-cladding interface. Rather, such effects lead to coupling from the modes of the pump and the Stokes wavelengths, coupling between the pump modes and the Stokes modes and to attenuation of both sets of modes. These approximations are reasonable. To evaluate the effect of SRS in multimode fibers, the following SRS differential equations are integrated across the aperture of the multimode fiber:

$$\int_F \left(\frac{d}{dz} I_s\right) dA = \int_F \{g_r I_p I_s - \alpha_s I_s\} dA \quad (2)$$

$$\int_F \left(\frac{d}{dz} I_p\right) dA = \int_F \{-g_r I_p I_s - \alpha_p I_p\} dA$$

The electric field of the pump and Stokes waves in the fiber are expressed in terms of the fiber mode set:

$$E_p(r) = \sum_n a_n \Psi_n e^{j\phi n} \quad (3)$$

$$E_s(r) = \sum_m b_m \psi_m e^{j\phi m}$$

By evaluating the time average of these fields times their complex conjugates, the intensities are given by:

$$I_p(r) = \sum_n a_n^2 \psi_n^2 \quad (4)$$

$$I_s(r) = \sum_n b_m^2 \psi_m^2$$

By integrating the intensities as given by equations (4) over the fiber aperture, we obtain the total pump power P and the total Stokes power S are obtained as the sum of the powers $P_n$, $S_m$ in the pump and Stokes modes, and can be expressed by the equation (5) as follows:

$$\sum_m b_m^2 \int_F \psi_m^2 dA = \sum_m S_m \quad (5)$$

$$\sum_n a_n^2 \int_F \psi_n^2 dA = \sum_n P_n$$

Ignoring the attenuation for the moment, equation (2) can be rewritten as:

$$\frac{d}{dz} \sum_n a_n^2 \int_F \psi_n^2 dA = -g_r \sum_n a_n^2 \sum_m b_m^2 \int_F \psi_n^2 \psi_m^2 dA \quad (6)$$

$$\frac{d}{dz} \sum_m a_m^2 \int_F \psi_m^2 dA = g_r \sum_n a_n^2 \sum_m b_m^2 \int_F \psi_n^2 \psi_m^2 dA$$

Matching up the equations for each mode and using expressions from equation (5) or the values of $a_n$ and $b_m$ in terms of the power in each pump and Stokes mode produces equation (7) as follows:

$$\frac{d}{dz} P_n = -g_r \sum_m P_n S_m \frac{\int_F \psi_n^2 \psi_m^2 dA}{\int_F \psi_n^2 dA \int_F \psi_m^2 dA} \quad (7)$$

$$\frac{d}{dz} S_m = g_r \sum_n S_m P_n \frac{\int_F \psi_n^2 \psi_m^2 dA}{\int_F \psi_n^2 dA \int_F \psi_m^2 dA}$$

The coupling coefficient between the $n^{th}$ pump mode and the $m^{th}$ Stokes mode as $K_{nm}$, can be defined and from equation (7) above, it is given by:

$$K_{nm} = \frac{g_r \int_F \psi_n^2 \psi_m^2 dA}{\int_F \psi_n^2 dA \int_F \psi_m^2 dA} \quad (8)$$

Including the appropriate coupling among the pump and Stokes modes and the attenuation terms, the final result is a system of differential equations for the power in the pump and Stokes modes:

$$\frac{d}{dz} P_n = -P_n \sum_m S_m K_{nm} - \sum_q K_{nq}(P_n - P_q) - \alpha_n P_n \quad (9)$$

$$\frac{d}{dz} S_m = S_m \sum_n P_n K_{nm} - \sum_o K_{mo}(S_m - S_o) - \alpha_m S_m$$

This system of equations must be numerically integrated down the length of the fiber subject to initial conditions. The modes of the fiber are ordered in descending brightness, that is, $m^2(n) < m^2(n+1)$. As an example computation, the lowest order Stokes mode can be injected at the input along with low levels for higher order modes, and the power in the pump modes could be distributed uniformly with mode number. The value of $\alpha_n$ is expected to increase with mode number because the mode amplitudes at the scattering interface between the core and cladding increases, and for the same reason the value of $k_{mn}$ will also increase as the order of the modes increases.

It is expected that if the Stokes signal is launched as a pure lowest order mode, it will maintain itself primarily in lowest order mode. This is because the lowest order Stokes mode can saturate all the pump modes and the loss for higher order Stokes modes is greater. Moreover, the scattering between the pump modes will redistribute pump power from those modes that have relatively low coupling to the lowest order Stokes into those that are strongly coupled and depleted quickly. Lastly, the higher losses for the higher order Stokes modes will reduce their net gain and prevent their build up.

The SRS process deposits energy in the fiber core, so cooling is required for high average power operation. As a rough order of magnitude estimate of the power handling capability of the proposed device, since approximately 50 W/m can be removed by robust heat sinking, it is possible to dissipate 10 kW in a 200 m fiber. For a 500 cm$^{-1}$ shift at 10,000 cm$^{-1}$, this would imply an output power of about 200 kW from a single multimode fiber. Since amplification of the Stokes signal preserves coherence, an array of such multimode fibers would provide scaling to the MW levels needed for some military applications.

The SRS amplifier effectuates efficient conversion of an output of a high power multimode laser to a high brightness, diffraction limited, single mode beam. Conversion is especially evident for lamp and diode pumped solid state lasers, semiconductor laser arrays, gas and chemical lasers, and metal vapor lasers such as a copper vapor laser.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A laser amplifier comprising:
    a non-doped optical fiber including a multi-mode signal core;

the optical fiber being subjected to a Stimulated Raman Scattering (SRS) signal process by a pump laser thus causing propagation of the SRS signal process along the optical fiber, thereby enabling power generation at arbitrary wavelengths and converting low brightness power from the pump laser to a diffraction limited beam.

2. The laser amplifier of claim 1 wherein the pump laser is operated in multimode.

3. The laser amplifier of claim 1 wherein the optical fiber further includes, a pump core, and an outer cladding which intrinsically propagates Raman gain along the optical fiber.

4. The laser amplifier of claim 3 wherein a refractive index ($n_s$) of the signal core is greater than a refractive index ($n_r$) of the pump core.

5. The laser amplifier of claim 3 wherein a refractive index ($n_r$) of the pump core is greater than a refractive index ($n_{cl}$) of the outer cladding.

6. The laser amplifier of claim 3 wherein a refractive index of the signal core ($n_s$) is greater than the refractive index of the pump core ($n_r$), and the refractive index of the pump core ($n_r$) is greater than the refractive index of the outer cladding ($n_{cl}$).

7. The laser amplifier of claim 1 wherein the signal mode core supports a Raman Shifted Wavelength signal from the pump laser, comprised essentially of its lowest order mode, thereby accommodating higher than single order modes of operation.

8. The laser amplifier of claim 3 wherein a spatial symmetry of the signal core and the outer cladding are dissimilar so as to provide strong coupling between a pumping light and an optical signal generated in the signal mode core.

9. A method for forming a laser power amplifier, comprising the steps of:

providing a non-doped optical fiber including a multimode signal core; and subjecting the optical fiber to a Stimulated Raman Scattering (SRS) signal process by a signal from a pump laser thus enabling power generation at arbitrary wavelengths by converting low brightness power from the pump laser to a diffraction limited beam.

10. The method according to claim 9, wherein the pump laser is operated in a multimode fashion.

11. The method according to claim 9, wherein the step of providing an optical fiber comprises providing an optical fiber having a pump core, and wherein a signal mode core refractive index ($n_s$) is greater than a refractive index ($n_r$) of the pump core.

12. The method according to claim 9, wherein the step of providing an optical fiber comprises providing an optical fiber having a pump core, and an outer cladding, wherein the pump core refractive index ($n_r$) is greater than an outer cladding refractive index ($n_{cl}$).

13. The method according to claim 12, wherein the signal core refractive index ($n_s$) is greater than the pump core refractive index ($n_r$), and the pump core refractive index ($n_r$) is greater than the outer cladding refractive index ($n_{cl}$).

14. The method according to claim 9, wherein the step of providing an optical fiber comprises providing an optical fiber having, a pump core, and an outer cladding, and wherein the multimode signal core supports a Raman shifted wavelength signal from the pump laser, comprised essentially of its lowest order mode, to thereby accommodate modes of operation greater than a single mode.

15. A method for forming a laser power amplifier, comprising the steps of:

providing a non-doped optical fiber having a multimode signal core and an outer cladding encasing the multimode signal core; and subjecting the multimode signal core to a signal at the Raman Shifted wavelength comprised essentially of its lowest order mode, thereby maintaining the signal as a single mode with improved beam quality propagating down the fiber and saturating any Raman gain.

* * * * *

UNITED STATES PATENT AND TRADEMARK OFFICE
CERTIFICATE OF CORRECTION

PATENT NO.    : 6,363,087 B1
DATED         : March 26, 2002
INVENTOR(S)   : Robert R. Rice It is certified that error appears in the above-identified patent and that said Letters Patent is hereby corrected as shown below:

Column 2,
Line 42, Add -- , which includes -- after "design"
Line 43, Add -- pump core, -- after "Raman"

Column 3,
Line 28, "($nc_{cl}$)" should be -- ($N_{cl}$) --

Column 5,
Line 52, "or" should be -- for --

Signed and Sealed this

Seventh Day of January, 2003

JAMES E. ROGAN
*Director of the United States Patent and Trademark Office*